No. 856,100. PATENTED JUNE 4, 1907.
G. PERRUCHON.
ELASTIC WHEEL.
APPLICATION FILED FEB. 27, 1905.

Witnesses.

Inventor.
Georges Perruchon.

UNITED STATES PATENT OFFICE.

GEORGES PERRUCHON, OF EPERNAY, FRANCE.

ELASTIC WHEEL.

No. 856,100.　　　Specification of Letters Patent.　　　Patented June 4, 1907.

Application filed February 27, 1905. Serial No. 247,616.

*To all whom it may concern:*

Be it known that I, GEORGES PERRUCHON, general of the French army, a citizen of the French Republic, residing at Epernay, Department of the Marne, France, have invented certain new and useful Improvements in Elastic Wheels, of which the following is a specification.

This invention has for its object to provide a vehicle wheel with an elastic or yielding felly which operates to protect both vehicles and wheels from injurious shocks and insures comfortable riding without resorting to the use of pneumatic tires with their attendant disadvantages.

The wheel forming the subject-matter of this invention has the material advantage of an elongated contact with the ground surface in the direction in which the vehicle is running so that the resistance to rolling motion is decreased when the car is running on soils having but little consistence.

The invention consists in the construction and arrangement of the several parts which will be more fully hereinafter set forth.

Figure 1:
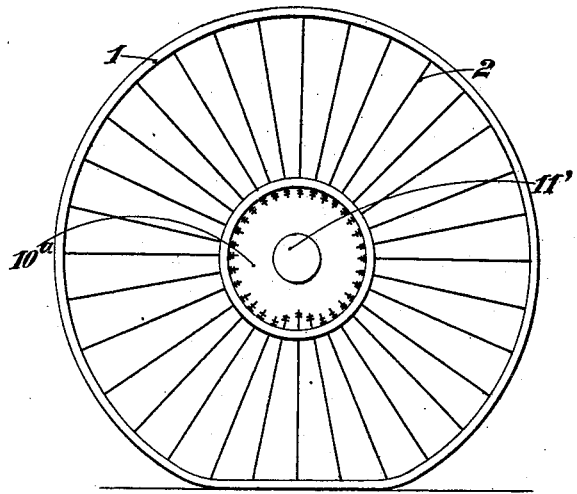
Figure 2:
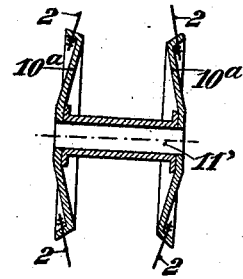
Figure 3:
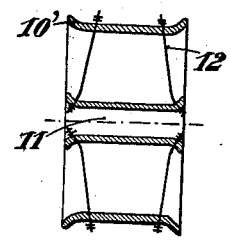
Figure 4:
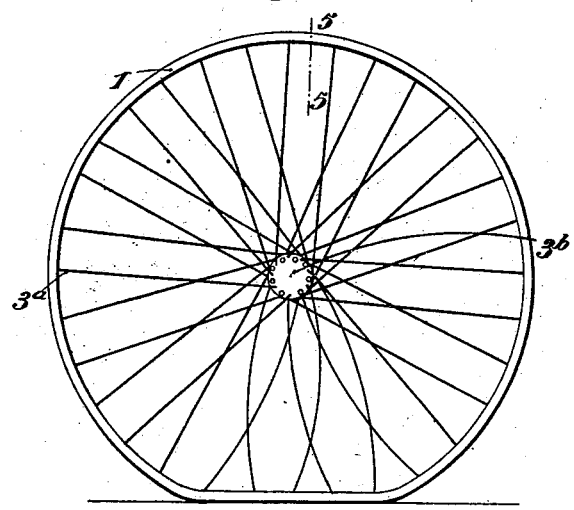
Figure 5:
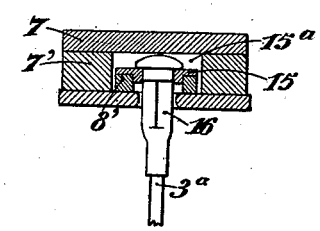

In the drawing: Figure 1 is a side elevation of a wheel embodying the features of the invention. Fig. 2 is a cross section through the hub structure of the wheel. Fig. 3 is a cross section of the hub structure showing a modification. Fig. 4 is a side elevation of a wheel showing another form of hub structure. Fig. 5 is a transverse vertical section on the line 5—5 of Fig. 4.

Similar numerals of reference are employed to indicate corresponding parts in the several views.

The numeral 1 designates a flexible or yielding felly connected to a hub by spokes 2, as shown by Figs. 1 and 2. The tread of the flexible or yielding felly may be suitably covered or provided with means for permitting the same to run as noiselessly as possible. The hub consists of two dished washers 10$^a$ of steel, connected to the terminals of a tubular hub 11', as clearly shown by Fig. 2. The spokes 2 are movable through the flanges of the dished washers 10$^a$ to compensate for the compression or flattening of the felly.

The hub structure is slightly modified as shown by Fig. 3, and consists of a cylinder 10' connected to the tubular hub 11' by auxiliary spokes 12.

Fig. 4 shows a further modification of the hub structure obviously applicable to the form disclosed in Fig. 1, wherein the spokes 3$^a$ are fixed to the hub 3$^b$ and do not have movement through any part of the latter, the spokes 3$^a$ being ordinary tangent spokes and formed of resilient material so that they may be deflected by virtue of their elasticity and thus permit the felly to become flattened at the part where it is in contact with the ground. The spokes 3$^a$ are slightly curved before being put in place so as to be sure that the deflection occurs at the proper place. The slight elongation of the spokes is obtained by means of an india-rubber washer 8' engaging the outer terminals of the spokes at the point of attachment thereof with the felly, each spoke in this structure having a head 16 between the outer portion of which and the felly the india-rubber washer 8' is interposed. The head 16 freely moves through the felly. The felly in this instance is covered with two leather bands 7 and 7' which are superposed, the inner band 7' being provided with circular recesses 15$^a$ for the reception of the other ends of the head 16 and of the india-rubber washer 8', the outer flanged end of the head 16 bearing against a plate or disk 15 contacting with the rubber washer. In this modified form of the wheel, bulging of the latter is counteracted as much as possible by arranging the faces of the hub to which the tangent spokes are attached as far apart as possible from each other, and convenient within the wheel structure. This particular construction and arrangement of rim disclosed by Fig. 5 is also adapted to be employed in connection with the form of wheel shown in Fig. 1.

The wheel as thus described will be found exceptionally advantageous, and in its operation the part thereof contacting with the ground is elongated in the direction in which the vehicle is running so that the resistance to rolling motion is decreased when the wheels are brought in contact with soils having comparatively little body or consistence. When the wheel is loaded with the weight it is intended to carry, that part of the felly which is in contact with the ground begins to flatten and all the spokes except those at the lower part of the wheel become slightly elongated and increase the diameter or span of the upper part of the circle. This enlargement or bulging causes an easy and perceptible flattening of the lower arc, the spokes of which offer no resistance to the flattening. Under variations of load, and shocks caused by unevenness of the road, the upper and side spokes are more or less elongated so that the whole of the elastic felly is called into action and its lower part more or less flattened. Many other advantages will be apparent in using the wheel; and changes in the proportions and dimensions may be adopted at will.

Having thus fully described the invention, what is claimed as new, is:—

A wheel of the class set forth having a resilient felly, a hub structure, normally straight spokes connecting the hub structure and felly, each spoke having a terminally disposed flanged head and carrying disks, and elastic washers interposed between the disks and the fellies and adapted to distend the said spokes after the pressure has been removed.

In testimony whereof I have hereunto set my hand in presence of two subscribing witnesses.

GEORGES PERRUCHON.

Witnesses:
PIERRE LEISSE,
THEODOR PINAUD.